United States Patent [19]

You

[11] Patent Number: 4,530,871
[45] Date of Patent: Jul. 23, 1985

[54] SKI CONSTRUCTION

[76] Inventor: Chin-San You, No. 3, La. 1029, Fong-Shih Rd., Fong Yuang City, Taiwan

[21] Appl. No.: 632,037

[22] Filed: Jul. 18, 1984

[51] Int. Cl.³ .................. B32B 5/28; B32B 21/10
[52] U.S. Cl. .................................. 428/111; 280/610;
428/156; 428/167; 428/249; 428/251; 428/252; 428/902
[58] Field of Search ............ 428/162, 156, 163, 167, 428/246, 290, 251, 284, 252, 537.1, 902, 249, 111; 180/180; 280/610

[56] References Cited

U.S. PATENT DOCUMENTS

| 3,369,821 | 2/1968 | Weber | 428/167 |
| 3,583,123 | 6/1971 | Holmgren et al. | 428/167 |
| 3,692,340 | 9/1972 | Roth | 428/163 |

Primary Examiner—Paul J. Thibodeau
Attorney, Agent, or Firm—Birch, Stewart, Kolasch & Birch

[57] ABSTRACT

A composite structural member for ski construction comprises at least two wooden layers and a reinforcing resin impregnated fiber layer adhesively bonded to and sandwiched between the wooden layers characterized in that the wooden layers are provided with raised bars which are meshed each other at their opposite sides.

4 Claims, 3 Drawing Figures

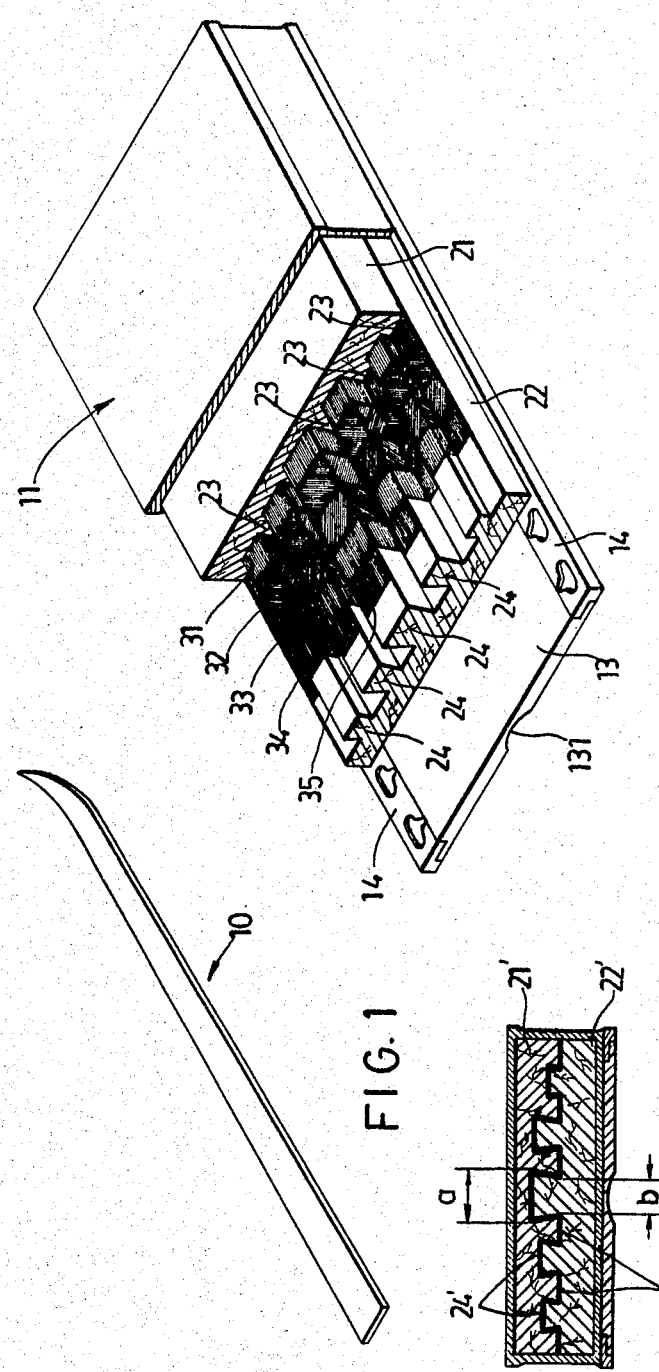

SKI CONSTRUCTION

BACKGROUND OF THE INVENTION

This invention relates to the construction of a ski, particularly to the composite structural member of a ski.

A typical composite ski construction is a sandwich construction which includes outer metal plates or plastic plates sandwiching a wooden plate or a polyurethane foam body. Although the ski with a foamed body has improved shock absorbing and torsional rigidity, it has one major disadvantage because its tensile strength remains relatively low, and therefore it has the propensity to frequently break under stress. An improvement to such sandwich construction can be accomplished by using interposed lamination having alternating wooden layers and resin impregnated glass fiber layers. However, such a lamination is easily damaged when subject to large impact forces.

SUMMARY OF THE INVENTION

An object of the present invention is to provide an improved ski construction having improved torsional rigidity and damping characteristics.

The foregoing and other objects can be achieved in accordance with the present invention through the provision of a composite structural member for a ski which comprises at least two wooden layers and a resin impregnated fiber layer adhesively bonded to and sandwiched between the wooden layers wherein in that the wooden layers are provided with rib members which are meshed to each other at their opposite sides.

Advantageously, the rib members extend from the surface of each wooden layer at different heights. In one aspect of the present invention, the width of each rib member is gradually contracted from its surface to the surface from which it begins to rise.

The preferred embodiment will be described in detail with reference to the accompanying drawings.

BRIEF DESCRIPTION OF THE DRAWINGS

FIG. 1 is a schematic view of a structural member for a ski;

FIG. 2 is a fragmentary cross sectional perspective view of a structural member of one embodiment; and FIG. 3 is a sectional elevation view of a structural member of another embodiment.

DETAILED DESCRIPTION OF THE PREFERRED EMBODIMENTS

Referring to the drawings, there is shown a ski construction 10 which includes a shell 11 made of an aluminium alloy, two wooden layers 21 and 22 and a reinforcing lamination. To the bottom side of the shell 11 is bonded a fiber reinforced plastic slide plate 13 of which edges are attached with L-shaped angled steel members 14. At the intermediate portion of the slide plate 13 is provided with a groove 131.

Each of wooden layers 21 and 22 are provided with longitudinal rib members 23 and 24 respectively, the cross sections of the rib members 23 or 24 being increasingly large from those lying at the lateral portions to that lying at the intermediate portion. Preferably, these rib members 23 or 24 extend from the surface of wooden layers at different heights. The rib members 23 and 24 are meshed to each other and the reinforcing lamination which includes layers of thermoseting resin impregnated woven fibers 31, 32, 33, 34 and 35 lies between the intermeshing rib members.

The first layer 31 includes carbon fibers each of which is oriented at a 0 degree angle with respect to the axis of the ski. The second layer 32 includes glass fibers each of which is oriented at a 30 degree angle with respect to the axis of the ski. The third layer 33 includes glass fibers each of which is oriented at a 30 degree angle with respect to the axis of the ski. The fourth layer includes Kevlar (DU PONT) fibers (Kevlar is a fiber from a highly rigid para-oriented aromatic polyamide) each of which is oriented at a 0 degree angle with respective to the axis of the ski. The fifth layer includes silicon fibers each of which is oriented at a 0 degree angle with respective to the axis of the ski.

These fiber layers 31, 32, 33, 34 and 35 are adhesively bonded to and placed, before the resin is hardened, between wooden layers 21 and 22 of which rib members 23 and 24 are then meshed to each other under pressure. After these layers are sandwiched between layers 21 and 22, the whole lamination is heated thereby forming a firmly integrated composite structure.

Due to the engagement of raised bars 23 and 24, the ski made according to the invention exhibits an excellent torsional rigidity. The reinforcing layers of different fibers and different fiber orientations also improve the strength of the ski so that the possibility of the ski breaking under stress is significantly reduced and therefore advantageous for various actions, such as turning, jumping etc.

Referring to FIG. 3, there is shown an another embodiment in which two wooden layers 21' and 22' have their ribs 23' and 24' shaped to a trapezium in their cross-sections. The width of each rib member 23' or 24' is gradually contracted to the plane at which it begins to rise, that is to say, the width a being grater than the width b. This construction improves the interface of the layers 21' and 22' so that the ski is more resistant to peeling in spite of high impact force.

With the invention thus explained, it is apparent that obvious modifications and variations can be made without departing from the scope of the invention. It is therefore intended that the invention be limited only as indicated in the appended claims.

I claim:

1. A composite structural member which comprises at least two wooden layers and a woven fiber layer impregnated with a thermosetting resin, said fiber layer being adhesively bonded to and sandwiched between said wooden layers and the opposing surfaces of said wooden layers being provided with rib members which are meshed to each other.

2. The composite structural member as claimed in claim 1, wherein the rib members extend from the opposing surface of each wooden layer to different heights.

3. The composite structural member as claimed in claim 1, wherein the rib members have a trapezoidal configuration.

4. The composite structural member as claimed in claim 1, wherein the fiber layer comprises a first layer of carbon fibers oriented at a 0 degree angle with respect to the axis of the structural member; a second layer of glass fibers oriented at a 30 degree angle with respect to the axis of the structural member; a third layer of glass fiber oriented at a 30 degree angle with respect to the axis of the structural member; a fourth layer of highly rigid para-oriented aromatic polyamide fibers oriented at a 0 degree angle with respect to the axis of the structural member; and a fifth layer of silicon fibers oriented at a 0 degree angle with respect to the axis of the structural member, each of said fiber layers being woven and impregnated with a thermosetting resin.

* * * * *